US010831764B2

(12) United States Patent
Ananthapur Bache et al.

(10) Patent No.: US 10,831,764 B2
(45) Date of Patent: Nov. 10, 2020

(54) QUERY PROCESSING AND ACCESS CONTROL IN A BLOCKCHAIN NETWORK (71) Applicant: International Business Machines Corporation, Armonk, NY (US)

(72) Inventors: Vijay Kumar Ananthapur Bache, Bangalore (IN); Jhilam Bera, Bangalore (IN); Vijay Ekambaram, Chennai (IN); Padmanabha Venkatagiri Seshadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 15/829,885

(22) Filed: Dec. 2, 2017

(65) Prior Publication Data
US 2019/0171744 A1 Jun. 6, 2019

(51) Int. Cl.
*H04L 9/06* (2006.01)
*G06F 16/2457* (2019.01)
*H04L 9/14* (2006.01)
*G06F 16/248* (2019.01)
*H04L 9/32* (2006.01)

(52) U.S. Cl.
CPC ...... *G06F 16/24575* (2019.01); *G06F 16/248* (2019.01); *H04L 9/0637* (2013.01); *H04L 9/14* (2013.01); *H04L 9/3239* (2013.01); *H04L 2209/38* (2013.01)

(58) Field of Classification Search
CPC ............ G06F 16/24575; G06F 16/248; H04L 9/0637; H04L 9/14
See application file for complete search history.

(56) References Cited

U.S. PATENT DOCUMENTS

| 6,865,569 | B1 * | 3/2005 | Gui | G06F 16/24539 |
| 2015/0149441 | A1 * | 5/2015 | Nica | G06F 16/24542 707/719 |
| 2016/0014095 | A1 * | 1/2016 | Strayer | H04L 63/0428 713/168 |
| 2016/0261404 | A1 | 9/2016 | Ford et al. | |
| 2017/0132626 | A1 | 5/2017 | Kennedy | |

(Continued)

OTHER PUBLICATIONS

Kotamsetty, Reshma, et al., "Adaptive Latency-Aware Query Processing on Encrypted Data for the Internet of Things," 2016 25th International Conference on Computer Communication and Networks (ICCCN), pp. 1-7, IEEE, 2016.

(Continued)

*Primary Examiner* — Trang T Doan
*Assistant Examiner* — Jessica J South (57) ABSTRACT An example operation may include one or more of identifying a query from a requesting entity, where the query requests access to one or more blockchains, converting the query to an expression tree, creating one or more expression tree variations based on the expression tree, the one or more expression tree variations provide one or more different expressions than the expression tree and a same result as the expression tree, determining access conformity between one or more expression tree variations and the expression tree, selecting an expression tree variation with a greatest conformity rating, performing the query using the expression tree variation with the greatest conformity rating, and providing query results to a requesting entity.

20 Claims, 9 Drawing Sheets (56) References Cited

U.S. PATENT DOCUMENTS

2018/0026979 A1* 1/2018 Cox ................... H04L 63/0428
 713/165
2018/0089041 A1* 3/2018 Smith ................ G06F 16/2255

OTHER PUBLICATIONS

Zyskind, Guy, et al., "Decentralizing Privacy: Using Blockchain to Protect Personal Data," Security and Privacy Workshops (SPW), 2015 IEEE, pp. 180-184, IEEE, 2015.

* cited by examiner

QUERY PROCESSING AND ACCESS CONTROL IN A BLOCKCHAIN NETWORK

TECHNICAL FIELD

This application generally relates to blockchain access, and more particularly, to query processing and access control in a blockchain network.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify any information. Because a blockchain is a distributed system, before adding a transaction to a blockchain ledger, all peers need to reach a consensus status.

Blockchains are becoming increasingly popular for exposing reliable and verifiably authenticated transactional content. However, large organizations would like to be selective in exposing their content and also desire to have various restrictions on how data is accessed/exposed. Under those conditions, a mechanism to manage queries over heterogeneous blockchains within a framework of fine-grained access control may optimize queries and maintain access control requirements.

SUMMARY

One example embodiment may provide a method that includes one or more of identifying a query from a requesting entity, wherein the query requests access to one or more blockchains, converting the query to an expression tree, creating one or more expression tree variations based on the expression tree, wherein the one or more expression tree variations provide one or more different expressions than the expression tree and a same result as the expression tree, determining access conformity between the one or more expression tree variations and the expression tree, selecting an expression tree variation with a greatest conformity rating, performing the query using the expression tree variation with the greatest conformity rating, and providing query results to a requesting entity.

Another example embodiment may include a processor configured to perform one or more of identify a query from a requesting entity, wherein the query requests access to one or more blockchains, convert the query to an expression tree, create one or more expression tree variations based on the expression tree, wherein the one or more expression tree variations provide one or more different expressions than the expression tree and a same result as the expression tree, determine access conformity between the one or more expression tree variations and the expression tree, select an expression tree variation with a greatest conformity rating, perform the query using the expression tree variation with the greatest conformity rating, and provide query results to the requesting entity.

Another example embodiment may include a non-transitory computer readable medium having stored therein program instructions that when executed cause a computer to perform one or more of identifying a query from a requesting entity, wherein the query requests access to one or more blockchains, converting the query to an expression tree, creating one or more expression tree variations based on the expression tree, wherein the one or more expression tree variations provide one or more different expressions than the expression tree and a same result as the expression tree, determining access conformity between the one or more expression tree variations and the expression tree, selecting an expression tree variation with a greatest conformity rating, performing the query using the expression tree variation with the greatest conformity rating, and providing query results to the requesting entity.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment.

Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to blockchain access, and in another embodiment relates to managing blockchain queries by processing the queries and using access control rules for optimal results in a blockchain network.

Example embodiments provide a system, device and method for secure query processing. The query may be a standard database query such as any known database query protocol or software application. The system configuration may provide fine-grained access control in a heterogeneous blockchain network of blockchains. In one example, an operating environment may involve multiple blockchain networks exposing their individual ledgers to a user/requesting entity that intends to submit queries spanning those ledgers.

Figure 1A:
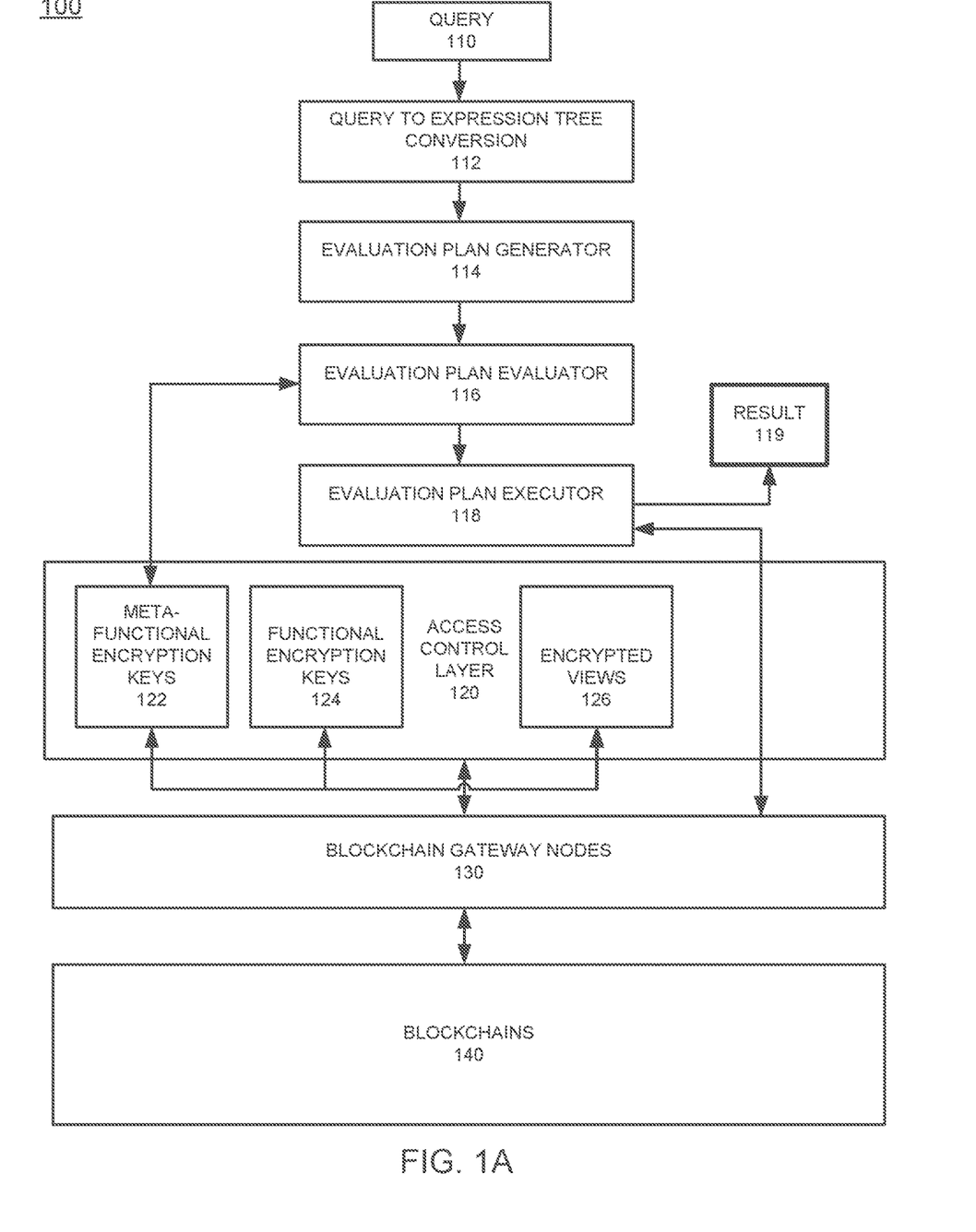
FIG. 1A illustrates a logic diagram of a blockchain query and access control management infrastructure, according to example embodiments.

FIG. 1A illustrates a logic diagram of a blockchain query and access control management infrastructure, according to example embodiments. Referring to FIG. 1A, the configuration 100 may provide a fine-grained access control layer 120, which interacts with the blockchain ledgers 140 to ensure secure and restricted access. The configuration may also include a query 110, a query to expression tree conversion 112, an evaluation plan generator 114 and evaluator 116, and execution layer 118, which accepts the user queries, creates execution plans for the query, by consuming the content in one or more of the ledgers in a distributed manner and evaluating the plans for access conformity. The plan with the highest access conformity (i.e., closest to 100 percent of the original plan or expression tree), will be selected and used to returns query results 119 to the requesting entity.

The access control layer 120 includes access to gateway nodes 130 in each blockchain network. One or nodes are assigned the task of becoming gateways 130 to expose the ledger 140 to queries. The access control layer 120 is deployed on those gateway nodes, and include a functional encryption (FE) key assignment module 124, which permits users to execute a function on encrypted data without decrypting the encrypted data. Each user is assigned a FE key based on a policy on the user's access profile. The FE key acts as the function to be applied on the encrypted data. Each user query is mapped to one or more FE keys. User submitted queries are essentially functions which map a user requirement to data stored in the ledgers. For instance, a database query is a function which returns a set of rows of the input table. Mapping can be used depending on the user's access privileges, queries (read functions) generated by the user entity are broken down into sub-functions and each such sub-function is mapped to a FE key from the set of allowed keys for that user profile, which might be executed when the query needs to be evaluated.

An encrypted view (EV) 126 may be created based on the FE function's requirement, a continuously updated view is created from the blockchain ledger. The view contains an encrypted row(s) of the ledger, which matches the conditions of the view. When new rows of data are generated as new transactions are added to the ledger, they are encrypted with the same key and appended to the view to continuously updated the view. A meta-functional (MF) encryption key 122 assignment provides functional encryption keys, with a purpose of reporting on the access conformity of a query with respect to the FE key assignment. In operation, a query is received as input, and returned along with a determination as to whether the encrypted view(s) corresponding to the query's data references (e.g., tables) actual cover the data references, and if so, what is the extent of coverage (percentage). For instance, if an EV contains all the data required to evaluate an FE corresponding to the query, then access conformity is 100% and that expression tree may be deemed fully compliant or fully conforming.

Figure 1B:
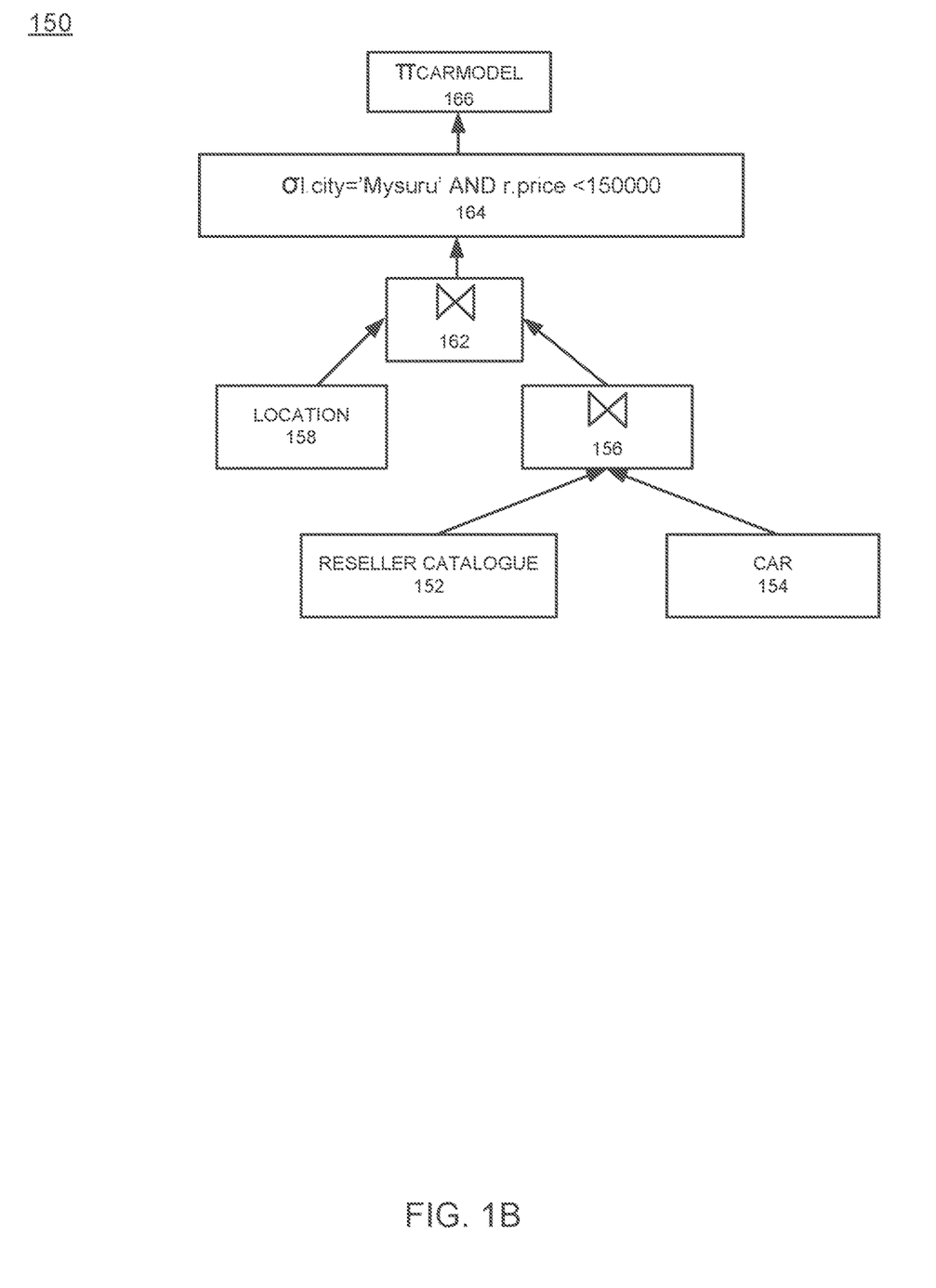
FIG. 1B illustrates an example expression tree derived from a submitted query, according to example embodiments.

In the query-to-expression tree converter operation 112, the input query is converted to a relational algebra expression tree, 'expression tree 1' 150, as illustrated in FIG. 1B. In this example, the relational algebra has equivalent operators for many query languages. One example query expression may be "SELECT c.CarModel FROM Car c, Location 1, ResellerCatalogue r WHERE c.Model_Id=1.Model_Id AND c.Model_Id=r.Model_Id AND 1.City='Mysuru' AND r.Price<150000." FIG. 1B illustrates an example expression tree derived from the submitted query, according to example embodiments. Using the evaluation plan generator 114, the expression tree 1-150 may be used to create multiple variants each representing an evaluation plan for the query as illustrated in FIGS. 1C and 1D.

Figure 1C:
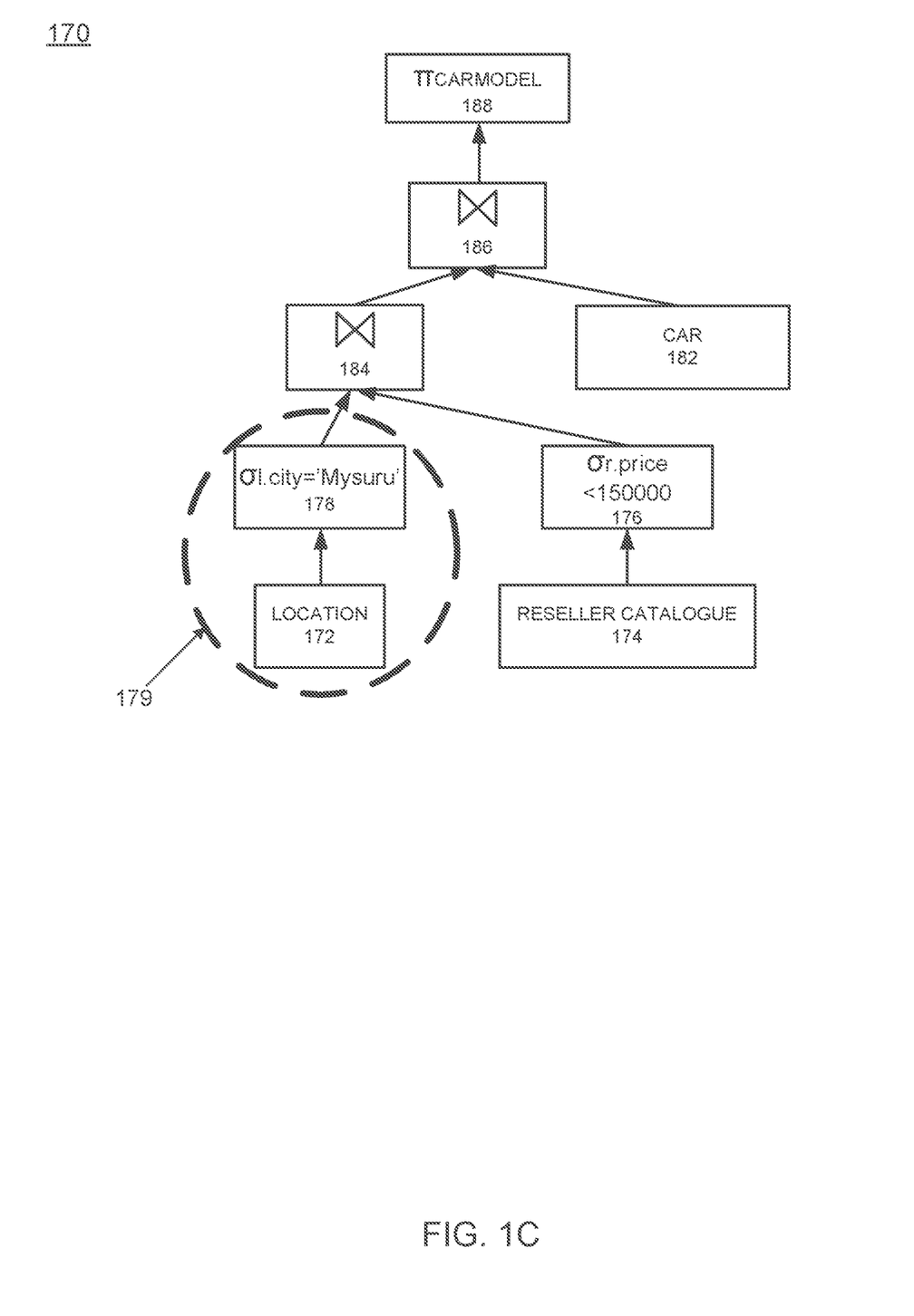
FIG. 1C illustrates an example expression tree variation derived from a submitted query, according to example embodiments.

FIG. 1C illustrates a first example expression tree variation derived from a submitted query, according to example embodiments. Referring to FIG. 1C, the first variation 170 is slightly different but provides a same result. The first variation tree 170 includes a location 172, a selection of a city 178, a join 184 with a price selection 176 from a reseller catalogue 174. The car 182 is joined 186 with the previous join 184 for a car selection model 188.

Figure 1D:
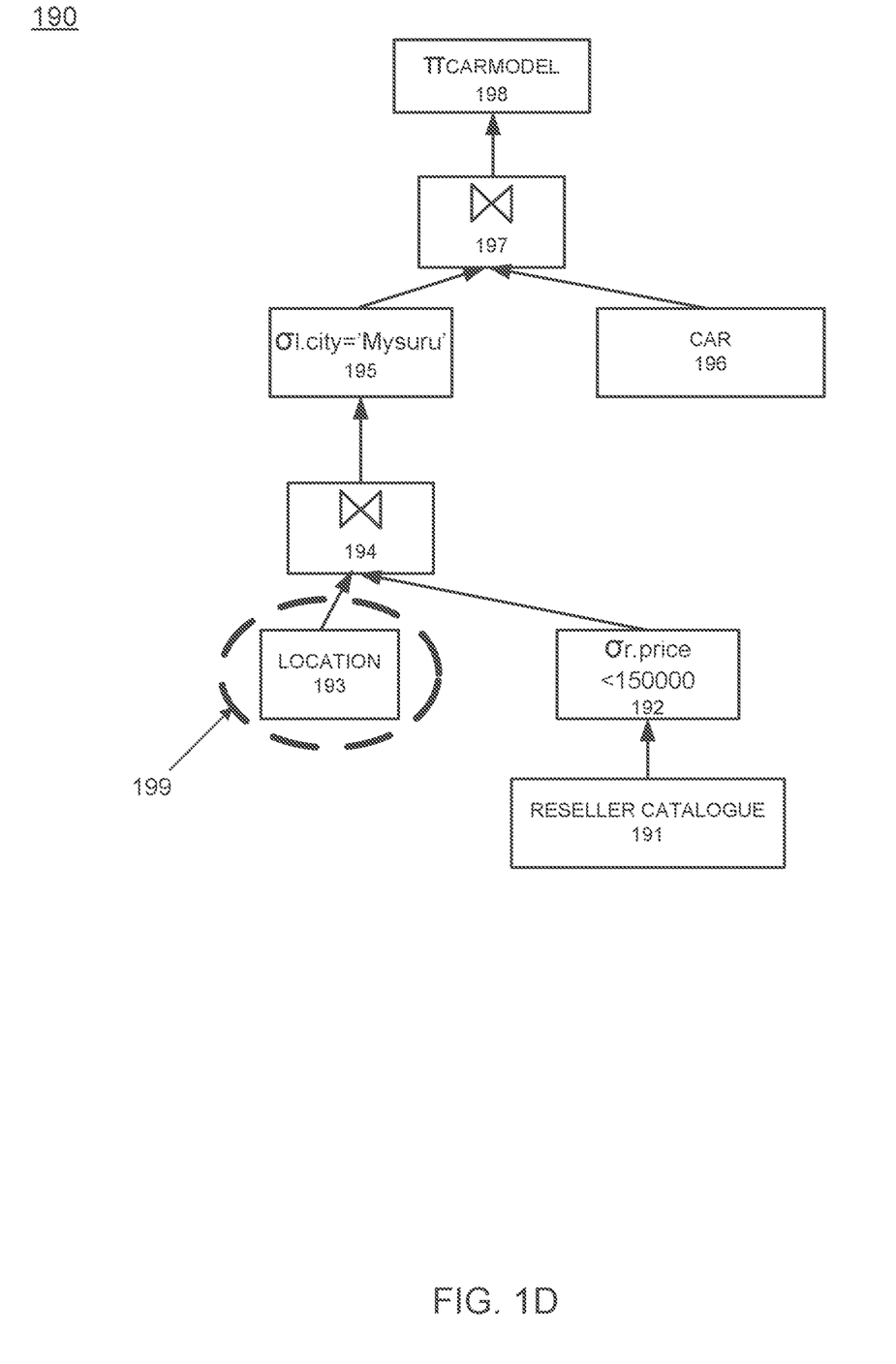
FIG. 1D illustrates another example expression tree variation derived from a submitted query, according to example embodiments.

FIG. 1D illustrates a second example expression tree variation derived from a submitted query, according to example embodiments. Referring to FIG. 1D, the second variation 190 also provides a similar result, however, this second tree variation has other expressions which are different from the other two trees. In this example, reseller catalogue 191 is used for a price 192 which is joined 194 with a location 193 for a city selection 195, which is then joined 197 with a car 196 to provide a car result 198.

In FIG. 1B, the original expression tree 1 identifies a reseller catalogue 152 and a car 154, which join 156 and which is also joined 162 with a location 158. The selection is then a city of Mysuru (India) AND a price of less than 150000 (rupees) 164. The final result is a particular car model(s) 166. The results of the expression tree variations 170 and 190 are also the same as the original expression tree 150, however, the expressions in the trees vary. For example, the location 172 and city 178 provide a different expression combination 179 in FIG. 1C than the expression location 199 in FIG. 1D. As a result of the conformity testing against ledger (table) data, the expression tree variation 1 of FIG. 1C evaluates to be 100 percent while the expression tree variation 2 is not 100 percent since the entire table of data is required. In this example, expression tree 1 is conforming and should be used to perform the query.

For each evaluation plan, the individual tables (child nodes of a 'join') are checked for coverage (i.e., access conformity) using the respective meta-functional encryption keys. The keys check the tables against the encrypted views (EV). Conformity is 100% when the EV contains the query results, but <100% when there is only overlap or non-overlapping range. For instance, if the EV permits only location details for cities in Karnataka (larger province of Mysuru), then expression tree 2 evaluates 100% while expression tree 3 fails to evaluate because the entire table is required in this example, and conformity is <100%. The evaluation plan executor will use the evaluation plan variation with the highest access conformity for query execution. The data tables are distributed across the corresponding EV and blockchain ledgers for execution. The gateways in each blockchain network could distribute the data across multiple nodes which have a replicated EV for the table. The results from each of the ledgers are aggregated according to the evaluation plan and then presented to the requesting entity.

In one example, consider various companies which have different blockchain ledgers of their own data, such as a government vehicle regulatory body: <Vehicle Number, Owner ID, Health check date, Status>, Hospital: <Owner Id, Health Report>, Automotive Service Center: <Vehicle Number, Owner ID, Service Type, Service Date, Service Description>, Automobile company: <Vehicle Number, Vehicle Type, Parts Pedigree>, etc. Suppose the government needs the data to investigate an apparent road traffic accident. Then all the above companies need to open their access to the government. Suppose the government desires to execute the query to find the root cause of the accident, such as to find evidence for one or more of the following cases: habit/health condition, which made the victim unfit for vehicle driving, victim apathy towards maintaining the vehicle fitness, and failure in the vehicle parts. Since all data is made available to the government, it has no problem in identifying the root cause. However, suppose a news agency wants to find the cause of accidents in the city, then the ledgers could take the following access form (only certain fields are exposed with the associated constraints): Government Vehicle Regulatory body (for years 2015-2017): <Vehicle Number, Owner ID, health check date, Status>, hospital (for Bangalore branch): <Owner ID, Health Report>, automotive service center (for year 2016-2017): <Vehicle Number, Owner ID, Service Type, Service Date, Service Description>, Automobile company (for 2017 models only): <Vehicle Number, Vehicle Type, Parts Pedigree {Only name and manufacturer of parts}>. The example embodiments permit the creation of encrypted views containing the exposed/available fields. Also, function keys are generated which only expose statistics such as average, aggregate, median statistics, correlation functions, but not the original data. The example method may also use the user's query and evaluate the plans to verify whether they could use views of access restriction without decrypting the views to avoid a data leak. For instance, the news agency could evaluate a correlation function on pollution related diseases and vehicle health check failures for Bangalore city for the years 2015-2017, without decrypting the views, but not for the year 2014 or for the city Chennai.

The system and method for secure query processing with fine-grained access control in heterogeneous blockchain networks is based on the heterogeneous blockchain network which is provided as a restricted-access, and which has encrypted views which could be queried by the user without decrypting the blockchain ledger view. User queries are translated to query plans which are then evaluated for maximum access conformity against the encrypted views. The nodes in the selected query plan are mapped to heterogeneous blockchain ledger encrypted views and corresponding function keys are applied to the views, to generate the results which are then aggregated and presented to the user. The configuration provides for selecting of a best access conforming query plan for executing and aggregating the result of a query without decrypting the content represented by encrypted views of heterogeneous blockchain network group in a distributed manner.

Figure 2:
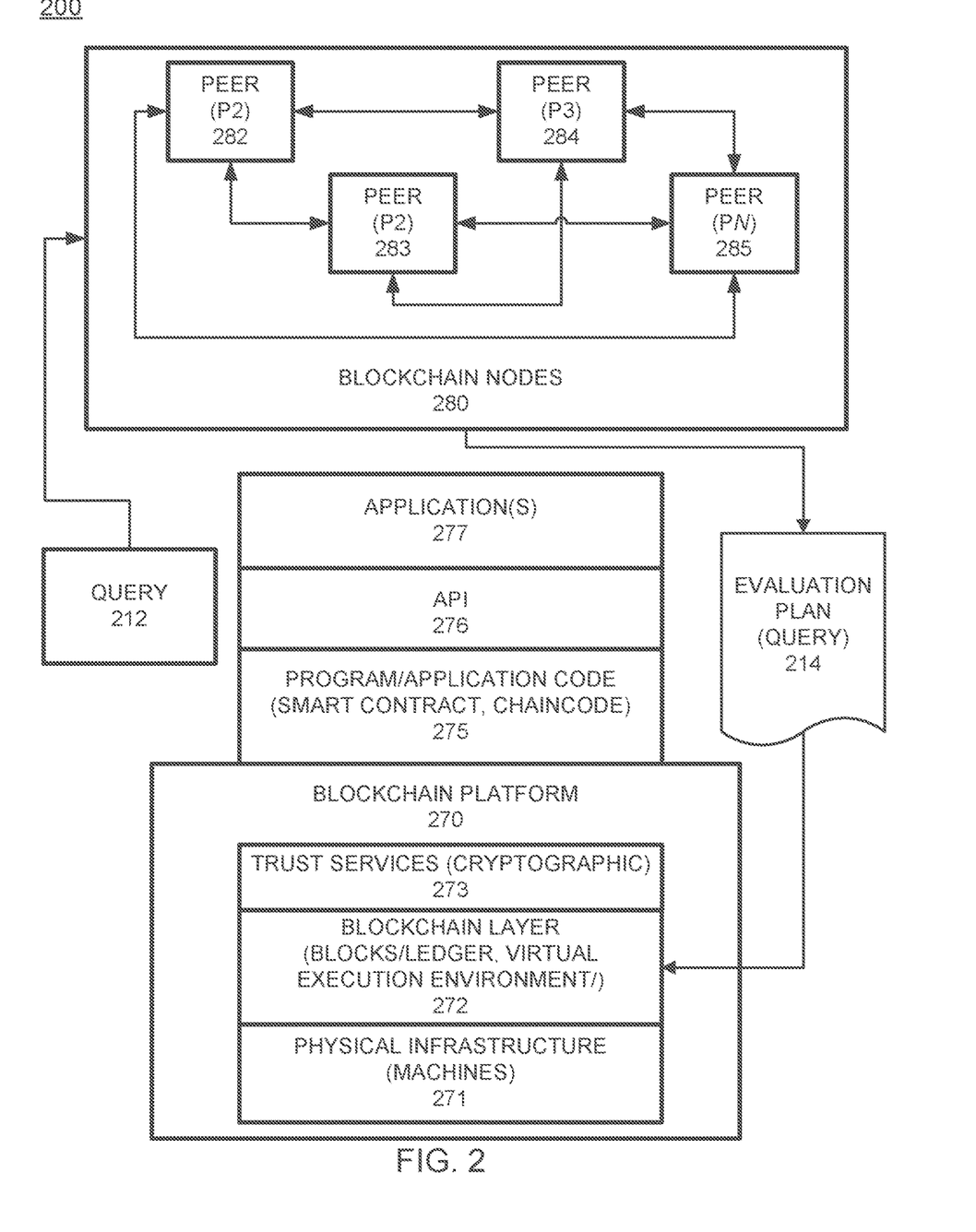
FIG. 2 illustrates an example blockchain configuration for processing a query, according to example embodiments.

FIG. 2 illustrates an example blockchain configuration for performing blockchain query access according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a query 212 may be submitted and may be identified by the peer nodes 280. The nodes may identify the need to process and perform an evaluation plan 214 of the query against information in the blockchain(s).

Figure 3:
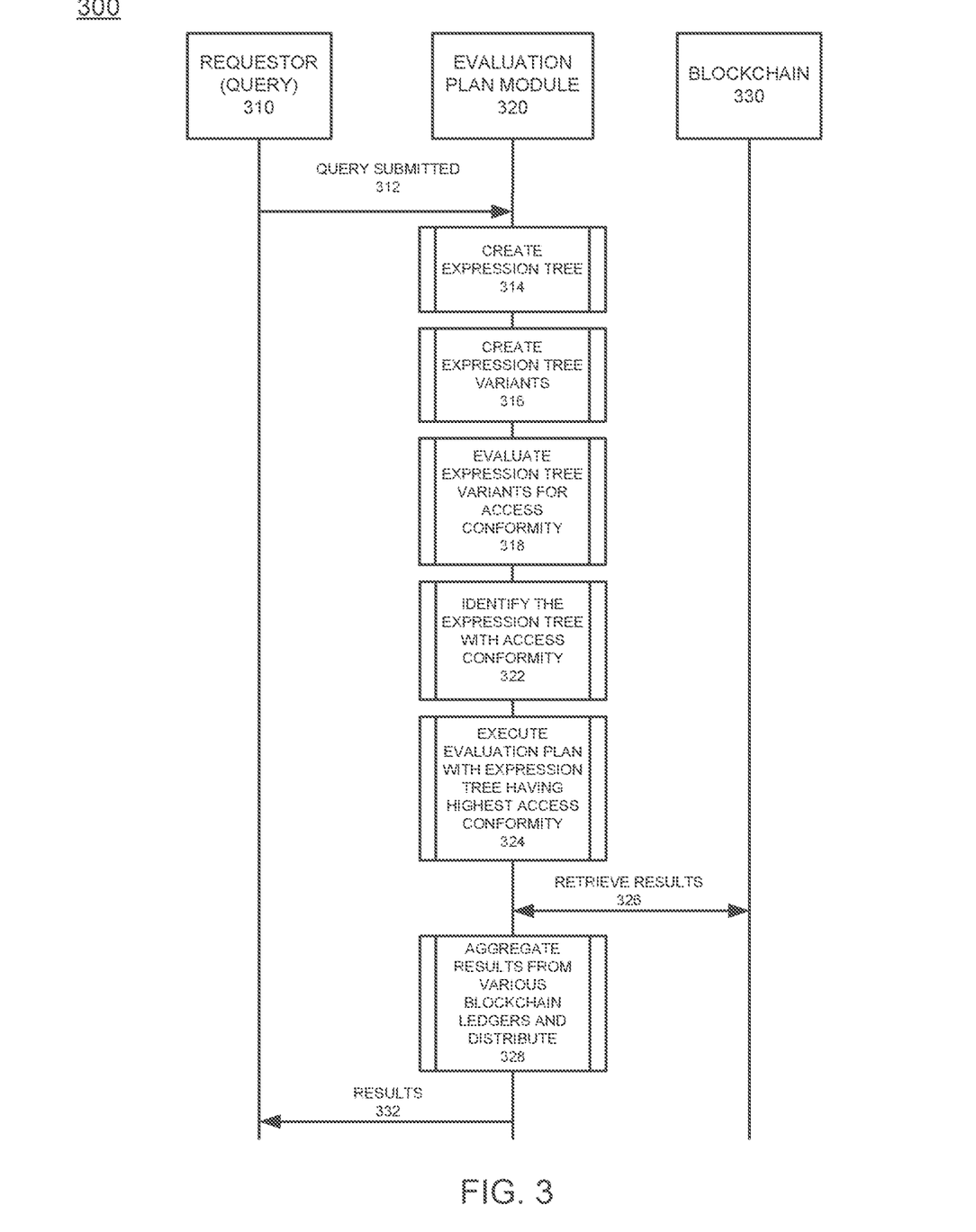
FIG. 3 illustrates a system messaging diagram for performing query and access control processing, according to example embodiments.

FIG. 3 illustrates a system messaging diagram 300 for performing query and access control processing, according to example embodiments. Referring to FIG. 3, the system may include a requestor entity (end user) 310 submitting a query 312 to an evaluation plan module 320 to create an expression tree 314, expression tree variants 316, an evaluation of the expression tree for access conformity ratings/measures 318. The expression tree with the best rating/conformity may be selected 322 to perform the query. An evaluation plan may be executed with the expression tree 324, due to its highest access conformity, and the results are retrieved 326 and aggregated 328 to be provided 332 to the requestor entity 310. The blockchain 330 may provide the information results, which are then forwarded to the requestor 310.

Figure 4A:
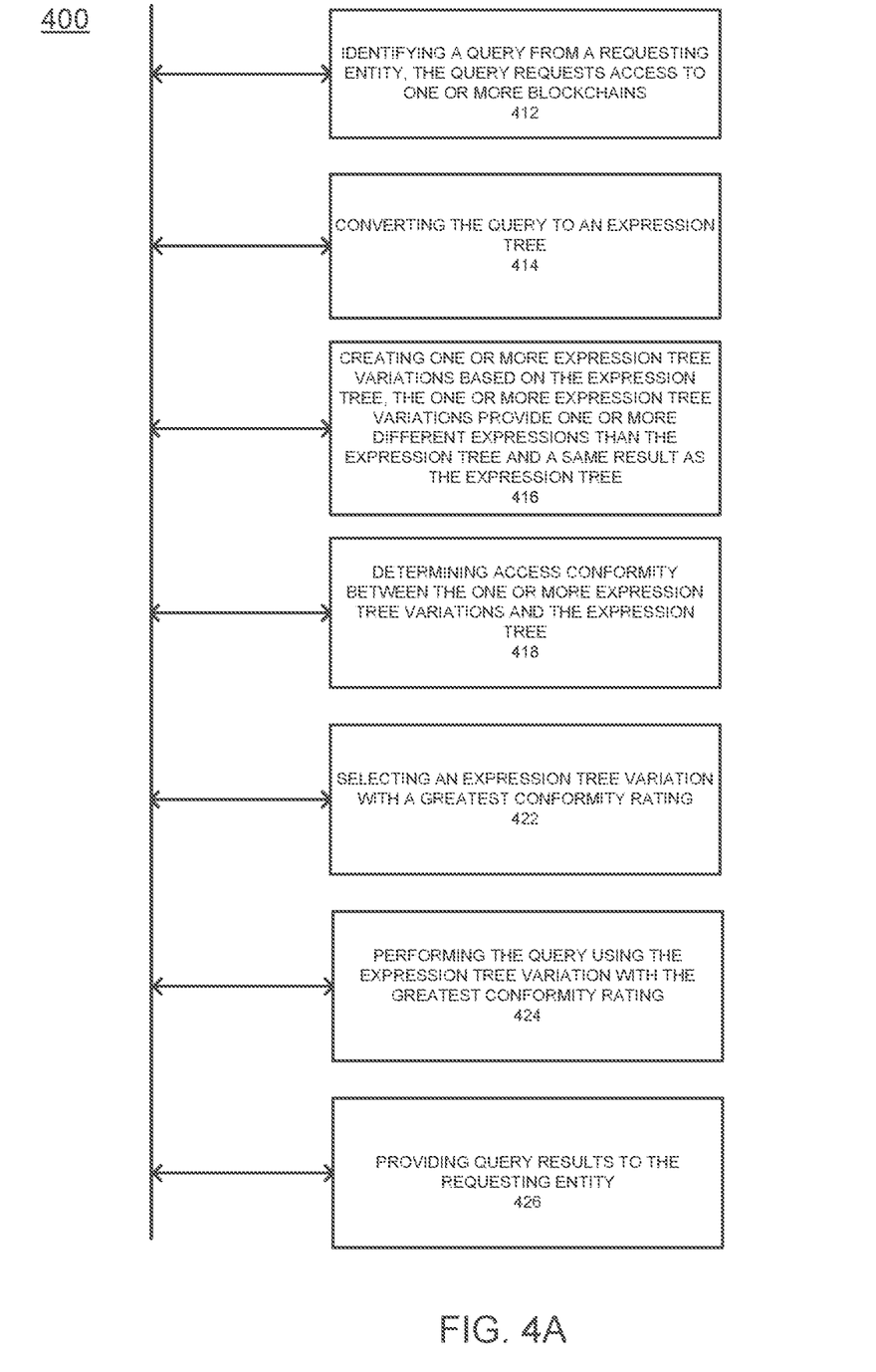
FIG. 4A illustrates a flow diagram of an example method of managing access control for a user submitted query, according to example embodiments.

FIG. 4A illustrates a flow diagram of an example method 400 of managing access control for a user submitted query, according to example embodiments. Referring to FIG. 4A, the method 400 may include identifying a query from a requesting entity, the query requests access to one or more blockchains 412, converting the query to an expression tree 414, creating one or more expression tree variations based on the expression tree, where the one or more expression tree variations provide one or more different expressions than the expression tree and a same result as the expression tree 416, determining access conformity between the one or more expression tree variations and the expression tree 418, selecting an expression tree variation with a greatest conformity rating 422, performing the query using the expression tree variation with the greatest conformity rating 424, and providing query results to a requesting entity 426. The method may also include comparing the one or more expression tree variations to one or more data tables associated with the one or more blockchains to identify the access conformity by using one or more meta-functional encryption keys to compare the one or more data tables to one or more encrypted views, and determining the conformity rating is complete when the one or more encrypted views contain the query results. The method may further provide determining the conformity rating is incomplete when the one or more encrypted views contain only a portion of the query results, and where the expression tree and the one or more expression tree variations are relational algebra expression trees. A functional encryption key, assigned to a user profile associated with the requesting entity, identifies one or more query access policies assigned to the user profile. The functional encryption key permits execution of a function on encrypted data without decrypting the data. The one or more encrypted views are continuously updated views based on data associated with the one or more blockchains.

Figure 4B:
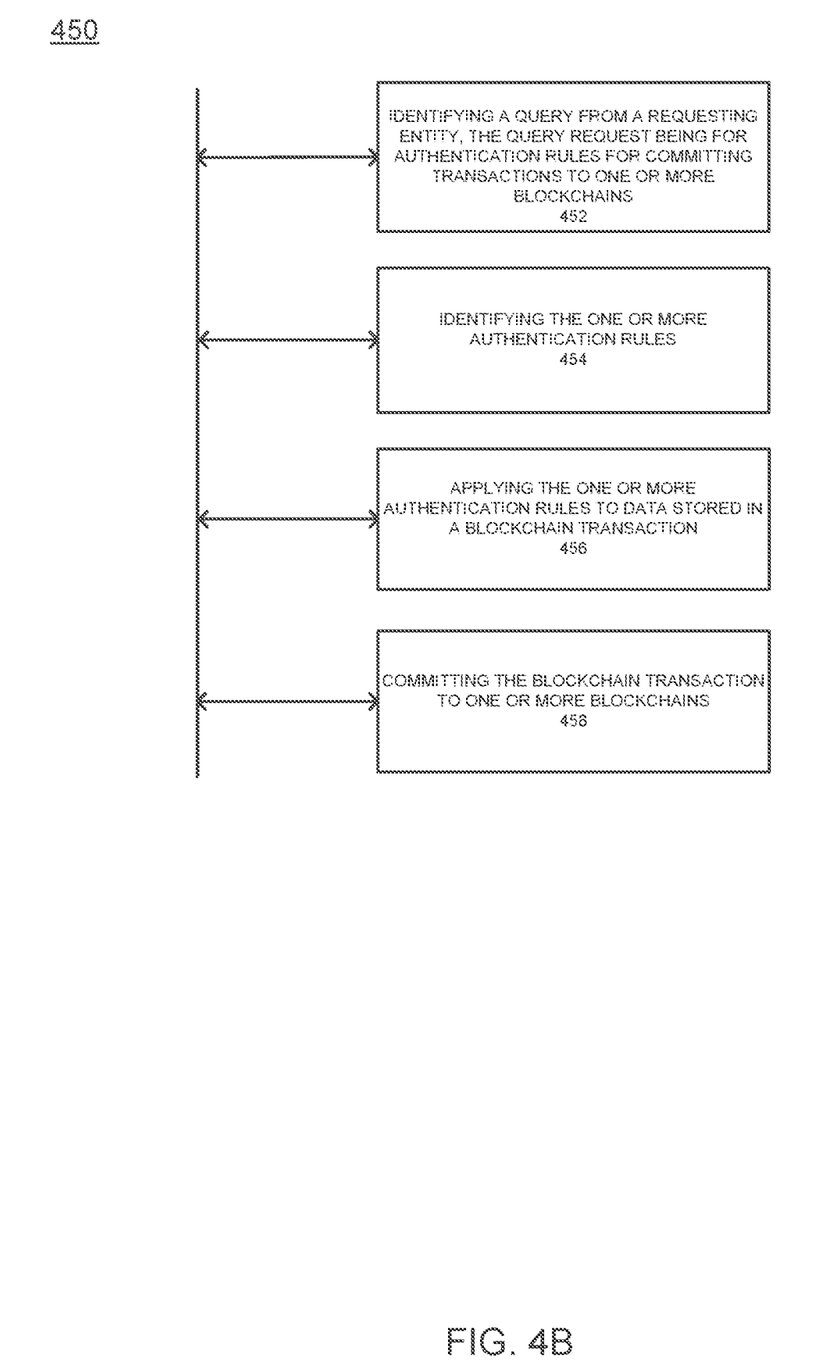
FIG. 4B illustrates another flow diagram of an example method of managing access control for a user submitted query, according to example embodiments.

FIG. 4B illustrates another flow diagram of an example method of managing access control for a user submitted query, according to example embodiments. Referring to FIG. 4B, the method 450 may include identifying a query from a requesting entity, wherein the query requests authentication rules for committing transactions to one or more blockchains 452, identifying the one or more authentication rules 454, applying the one or more authentication rules to data stored in a blockchain transaction 456, and committing the blockchain transaction to one or more blockchains 458.

In this embodiment, a querying module may execute queries to a rules database prior to attempting to commit a transaction to a blockchain. The querying module may, for example, execute a query on the rules database to identify authentication rules and/or verification rules to be applied to data stored in one or more blockchain transactions to be committed to a blockchain ledger. Then the data is identified according to its rules and may be processed accordingly and queried appropriately.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
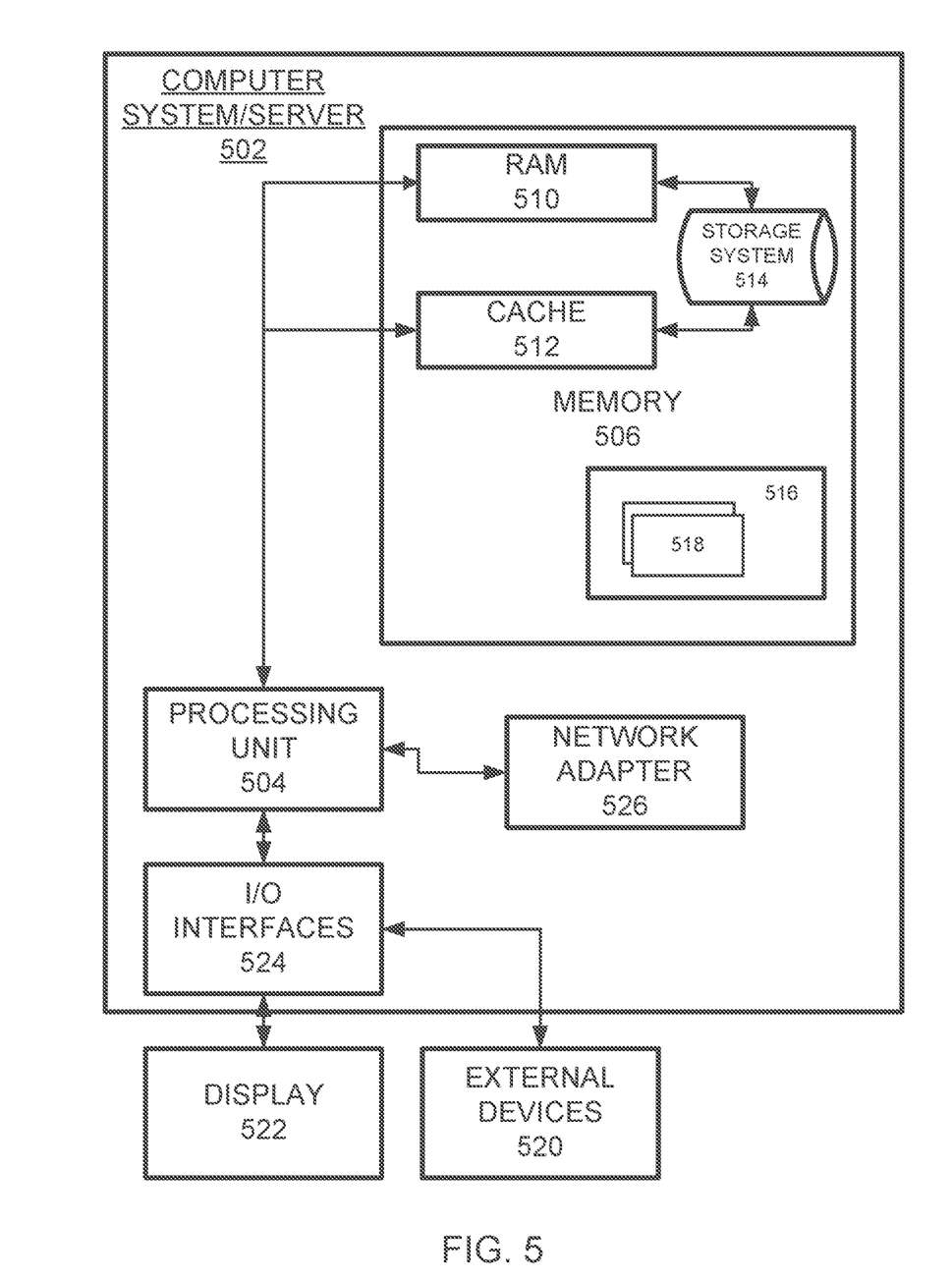
FIG. 5 illustrates an example computer system/server configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying a query from a requesting entity, wherein the query requests access to one or more blockchains;
   converting the query to an expression tree;
   creating one or more expression tree variations based on the expression tree, wherein the one or more expression tree variations provide one or more different expressions than the expression tree and a same result as the expression tree;
   identifying an access conformity rating for the one or more expression tree variations by comparing the one or more expression tree variations to one or more data tables associated with the one or more blockchains, the comparing including using one or more meta-functional encryption keys to compare the one or more data tables to one or more encrypted views;
   selecting an expression tree variation with a greatest access conformity rating;
   performing the query using the expression tree variation with the greatest access conformity rating; and
   providing query results to the requesting entity.

2. The method of claim 1, further comprising:
   determining that the access conformity rating is complete when the one or more encrypted views contain the query results.

3. The method of claim 2, further comprising:
   determining that the access conformity rating is incomplete when the one or more encrypted views contain only a portion of the query results.

4. The method of claim 1, wherein the expression tree and the one or more expression tree variations are relational algebra expression trees.

5. The method of claim 1, wherein the one or more meta-functional encryption keys are assigned to a user profile associated with the requesting entity, and identify one or more query access policies assigned to the user profile.

6. The method of claim 5, wherein the one or more meta-functional encryption keys permit execution of a function on encrypted data.

7. The method of claim 2, wherein the one or more encrypted views are continuously updated views based on blockchain data associated with the one or more blockchains.

8. An apparatus, comprising:
   a hardware-implemented processor configured to:
      identify a query from a requesting entity, wherein the query requests access to one or more blockchains;
      convert the query to an expression tree;
      create one or more expression tree variations based on the expression tree, wherein the one or more expression tree variations provide one or more different expressions than the expression tree and a same result as the expression tree;
      identify an access conformity rating for the one or more expression tree variations based on a comparison of the one or more expression tree variations to one or more data tables associated with the one or more blockchains, the comparison including using one or more meta-functional encryption keys to compare the one or more data tables to one or more encrypted views;
      select an expression tree variation with a greatest access conformity rating;
      perform the query using the expression tree variation with the greatest access conformity rating; and
      provide query results to the requesting entity.

9. The apparatus of claim 8, wherein the hardware-implemented processor is further configured to:
   determine that the access conformity rating is complete when the one or more encrypted views contain the query results.

10. The apparatus of claim 9, wherein the hardware-implemented processor is further configured to:
    determine that the access conformity rating is incomplete when the one or more encrypted views contain only a portion of the query results.

11. The apparatus of claim 8, wherein the expression tree and the one or more expression tree variations are relational algebra expression trees.

12. The apparatus of claim 8, wherein the one or more meta-functional encryption keys are assigned to a user profile associated with the requesting entity, and identify one or more query access policies assigned to the user profile.

13. The apparatus of claim 12, wherein the one or more meta-functional encryption keys permit execution of a function on encrypted data.

14. The apparatus of claim 9, wherein the one or more encrypted views are continuously updated views based on blockchain data associated with the one or more blockchains.

15. A non-transitory computer readable storage medium configured to store one or more instructions that when executed by a processor cause the processor to perform:
    identifying a query from a requesting entity, wherein the query requests access to one or more blockchains;
    converting the query to an expression tree;
    creating one or more expression tree variations based on the expression tree, wherein the one or more expression tree variations provide one or more different expressions than the expression tree and a same result as the expression tree;
    identifying an access conformity rating for the one or more expression tree variations by comparing the one or more expression tree variations to one or more data tables associated with the one or more blockchains, the comparing including using one or more meta-functional encryption keys to compare the one or more data tables to one or more encrypted views;

selecting an expression tree variation with a greatest access conformity rating;

performing the query using the expression tree variation with the greatest access conformity rating; and providing query results to the requesting entity.

16. The non-transitory computer readable storage medium of claim 15, further configured to store one or more instructions that when executed by the processor cause the processor to perform:

determining that the access conformity rating is complete when the one or more encrypted views contain the query results.

17. The non-transitory computer readable storage medium of claim 15, further configured to store one or more instructions that when executed by the processor cause the processor to perform:

determining that the access conformity rating is incomplete when the one or more encrypted views contain only a portion of the query results.

18. The non-transitory computer readable storage medium of claim 15, wherein the expression tree and the one or more expression tree variations are relational algebra expression trees.

19. The non-transitory computer readable storage medium of claim 15, wherein the one or more meta-functional encryption keys are assigned to a user profile associated with the requesting entity, and identify one or more query access policies assigned to the user profile.

20. The non-transitory computer readable storage medium of claim 19, wherein the one or more meta-functional encryption keys permit execution of a function on encrypted data without decrypting the encrypted data, and wherein the one or more encrypted views are continuously updated views based on blockchain data associated with the one or more blockchains.

* * * * *